(12) United States Patent
Jeon

(10) Patent No.: US 11,327,169 B2
(45) Date of Patent: May 10, 2022

(54) APPARATUS AND METHOD FOR COMPLEMENTING AUTOMOTIVE RADAR

(71) Applicant: MANDO MOBILITY SOLUTIONS CORPORATION, Gyeonggi-do (KR)

(72) Inventor: SeungKi Jeon, Gyeonggi-do (KR)

(73) Assignee: MANDO MOBILITY SOLUTIONS CORPORATION, Gyeonggi-Do (KR)

( * ) Notice: Subject to any disclaimer, the term of this patent is extended or adjusted under 35 U.S.C. 154(b) by 212 days.

(21) Appl. No.: 16/595,372

(22) Filed: Oct. 7, 2019

(65) Prior Publication Data
US 2020/0116854 A1 Apr. 16, 2020

(30) Foreign Application Priority Data

Oct. 10, 2018 (KR) .................. 10-2018-0120199

(51) Int. Cl.
| | | |
|---|---|---|
| *G01S 13/86* | (2006.01) | |
| *G01S 7/40* | (2006.01) | |
| *G01S 13/931* | (2020.01) | |
| *G01S 13/00* | (2006.01) | |

(52) U.S. Cl.
CPC .......... *G01S 13/867* (2013.01); *G01S 7/4026* (2013.01); *G01S 13/931* (2013.01); *G01S 7/403* (2021.05); *G01S 7/4039* (2021.05)

(58) Field of Classification Search
None
See application file for complete search history.

(56) References Cited

U.S. PATENT DOCUMENTS

| | | | | |
|---|---|---|---|---|
| 6,999,896 | B2* | 2/2006 | Takahashi | G01S 13/931 702/181 |
| 8,775,064 | B2* | 7/2014 | Zeng | G01S 7/4026 701/301 |
| 9,182,477 | B2* | 11/2015 | Jones | G01S 13/931 |
| 9,221,396 | B1* | 12/2015 | Zhu | G01S 13/867 |
| 9,645,236 | B2* | 5/2017 | Baba | G01S 13/931 |
| 9,945,927 | B2* | 4/2018 | Baba | G01S 13/867 |
| 10,217,024 | B2* | 2/2019 | Baba | G01S 13/867 |
| 10,578,713 | B2* | 3/2020 | Yomo | G01S 7/4026 |
| 10,890,648 | B2* | 1/2021 | Appia | G01S 7/4026 |
| 2014/0333467 | A1* | 11/2014 | Inomata | G01S 13/867 342/27 |

(Continued)

FOREIGN PATENT DOCUMENTS

| | | | | |
|---|---|---|---|---|
| EP | 3364210 A1 | * | 8/2018 | ......... G01S 13/931 |
| EP | 3415943 A1 | * | 12/2018 | ......... G01S 7/4026 |

*Primary Examiner* — Bernarr E Gregory
(74) *Attorney, Agent, or Firm* — Ladas & Parry, LLP

(57) ABSTRACT

The present disclosure provides an apparatus for complementing automotive radar, which comprises a camera for obtaining an image of a field of view, a radar sensor for transmitting a radar signal and detecting a radar signal reflected by an object, and a controller for obtaining first information on a target from the image, setting a monitoring range of the radar sensor according to the obtained first information, obtaining second information on the target based on a radar signal detected in the monitoring range, and detecting malfunction of the radar by determining whether or not the first information matches the second information, and further provides a method thereof. According to the present disclosure, it is possible to quickly detect malfunction of the radar sensor.

18 Claims, 9 Drawing Sheets

(56) References Cited

U.S. PATENT DOCUMENTS

| | | | |
|---|---|---|---|
| 2016/0288799 A1* | 10/2016 | Nguyen Van | G01S 13/931 |
| 2017/0169627 A1* | 6/2017 | Kim | G01S 13/931 |
| 2017/0227634 A1* | 8/2017 | Matsumoto | G01S 13/931 |
| 2018/0039269 A1* | 2/2018 | Lambermont | G01S 13/931 |
| 2018/0156913 A1* | 6/2018 | Baba | G01S 13/867 |
| 2018/0196133 A1* | 7/2018 | Sun | G01S 13/867 |
| 2019/0285726 A1* | 9/2019 | Muto | G01S 13/867 |

* cited by examiner

APPARATUS AND METHOD FOR COMPLEMENTING AUTOMOTIVE RADAR

CROSS REFERENCE TO RELATED APPLICATION

This application claims priority from Korean Patent Application No. 10-2018-0120199, filed on Oct. 10, 2018, which is hereby incorporated by reference for all purposes as if fully set forth herein.

BACKGROUND OF THE INVENTION

1. Field of the Invention

The present disclosure relates to an apparatus and a method for complementing automotive radar, which complement the operation of automotive radar using a camera.

2. Description of the Prior Art

Recently, various devices for assisting a driver in driving a vehicle or for autonomous driving have been commercialized or developed. With this trend, radar provided in a vehicle is used for sensing objects around the vehicle and providing information, thereby assisting in the driving of the vehicle.

When foreign matter or objects exists close to the automotive radar, a transmission antenna or a reception antenna of the radar may be blocked. The blockage of the radar may cause deterioration of the operation of the automotive radar or malfunction of the automotive radar. In addition, if the radar is misaligned, the automotive radar may not operate properly. As a result, the accuracy and reliability of the radar may be degraded.

Therefore, there is growing need for a technique for quickly detecting malfunction such as blockage or misalignment of the radar.

SUMMARY OF THE INVENTION

In view of the foregoing background, an aspect of the present disclosure is to provide an apparatus and a method for complementing automotive radar, which can more quickly and accurately detect whether or not radar is blocked using error information calculated by comparing target information based on an image obtained by a camera with target information based on a radar signal.

Another aspect of the present disclosure is to provide an apparatus and a method for complementing automotive radar, which can more quickly and accurately detect whether or not the radar is misaligned using error information calculated by comparing target information based on an image obtained by a camera with target information based on a radar signal.

According to one aspect, the present disclosure provides an apparatus for complementing automotive radar, which includes: an image sensor operable to be disposed in a vehicle so as to have a field of view of the exterior of the vehicle, the image sensor configured to capture image data; a radar sensor operable to be disposed in the vehicle so as to have a field of sensing for the exterior of the vehicle, the radar sensor configured to capture sensing data; at least one processor configured to process the image data captured by the image sensor and the sensing data captured by the radar sensor; and a controller configured to detect a malfunction of the radar sensor, based at least in part on the processing of the image data and the sensing data, wherein the controller is configured to: obtain first information on a target from an image obtained based on the processing of the image data; set a monitoring range of the radar sensor according to the obtained first information; obtain second information on the target based on a radar signal detected in the monitoring range; and detect malfunction of the radar sensor by determining whether or not the first information matches the second information.

According to another aspect, the present disclosure provides an apparatus for complementing automotive radar, which includes: an image sensor operable to be disposed in a vehicle so as to have a field of view of the exterior of the vehicle, the image sensor configured to capture image data; a radar sensor operable to be disposed in the vehicle so as to have a field of sensing for the exterior of the vehicle, the radar sensor configured to capture sensing data; and a domain control unit configured to process the image data captured by the image sensor and the sensing data captured by the radar sensor, and configured to control at least one driver assistance system provided in the vehicle, wherein the domain control unit is configured to: based at least in part on the processing of the image data and the sensing data, obtain first information on a target from an image obtained based on the processing of the image data; set a monitoring range of the radar sensor according to the obtained first information; obtain second information on the target based on a radar signal detected in the monitoring range; and detect malfunction of the radar sensor by determining whether or not the first information matches the second information.

According to another aspect, the present disclosure provides an image sensor operable to be disposed in the vehicle so as to have a field of view of the exterior of the vehicle, the image sensor configured to capture image data, wherein the image data is processed by a processor and is used to obtain first information on a target and is used to set a monitoring range of a radar sensor according to the obtained first information, and wherein monitoring range information is used to obtain second information on the target based on a radar signal detected in the monitoring range and is used to detect malfunction of the radar sensor by determining whether or not the first information matches the second information.

According to another aspect, the present disclosure provides a method for complementing automotive radar, which includes: obtaining an image of a field of view through a camera to obtain first information on a target; setting a monitoring range of a radar sensor according to the first information; obtaining second information on the target based on a radar signal detected in the monitoring range; and detecting malfunction of the radar sensor by determining whether or not the first information matches the second information.

As described above, according to the present disclosure, it is possible to provide an apparatus and a method for complementing automotive radar, which can more quickly and accurately detect whether or not the radar is blocked using error information calculated by comparing target information based on an image obtained by a camera with target information based on a radar signal.

In addition, according to the present disclosure, it is possible to provide an apparatus and a method for complementing automotive radar, which can more quickly and accurately detect whether or not the radar is misaligned using error information calculated by comparing target information based on an image obtained by a camera with target information based on a radar signal.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
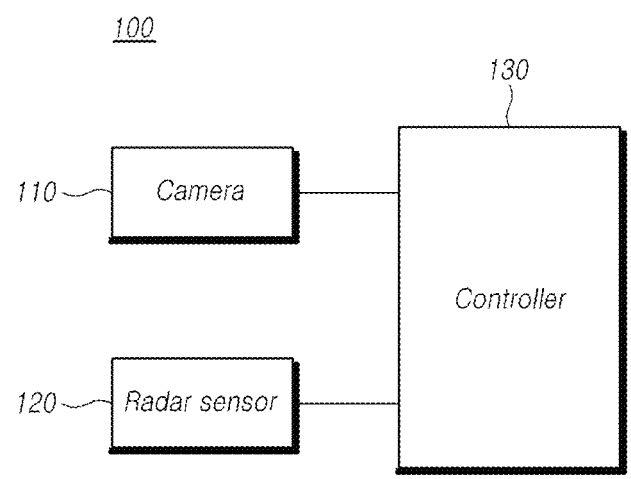
FIG. 1 is a block diagram of an apparatus for complementing automotive radar according to an embodiment of the present disclosure.

Hereinafter, embodiments of the present disclosure will be described in detail with reference to the accompanying drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Unless defined otherwise, all terms as used herein (including technical terms and scientific terms) have the same meaning as commonly understood by a person of ordinary skill in the art to which the present disclosure pertains. Such terms as those defined in a generally used dictionary are not to be interpreted to have ideal or excessively meanings unless clearly defined in the present disclosure. The terms as described below are defined in consideration of the functions of the present disclosure, but the meaning of the terms may be changed according to a user, intention of an operator, or convention. Therefore, the definitions of the terms should be made based on the contents throughout the specification.

In the present disclosure, the term "blockage of a radar sensor" refers to various states in which a certain object is in close proximity to a radar sensor provided in a vehicle, or in which a radar sensor is covered with foreign matter, such as snow, so that transmission or detection of a radar signal is disturbed. In addition, the term "target" may mean any one of preceding vehicles in front of the running vehicle, and, in some cases, may mean a pedestrian, a bicycle, or a motorcycle.

Hereinafter, an apparatus and a method for complementing automotive radar according to embodiments of the present disclosure will be described with reference to the accompanying drawings.

FIG. 1 is a block diagram of an apparatus for complementing automotive radar according to an embodiment of the present disclosure.

Referring to FIG. 1, an apparatus 100 for complementing automotive radar according to the present disclosure includes a camera 110 for obtaining an image of a field of view, a radar sensor 120 for transmitting a radar signal and detecting a radar signal reflected by an object, and a controller 130 for obtaining first information on a target from the image, setting a monitoring range of the radar according to the obtained first information, obtaining second information on the target based on a radar signal detected in the monitoring range, and detecting malfunction of the radar sensor by determining whether or not the first information matches the second information.

According to an example, the camera 110 may include an image sensor disposed in the vehicle so as to have a field of view of the exterior of the vehicle and configured to capture image data, and a processor configured to process the image data captured by the image sensor. According to an example, the image sensor and the processor may be implemented as a single module.

The image sensor may be disposed in the vehicle so as to have a field of view of the exterior of the autonomous vehicle. One or more image sensors may be mounted on the respective parts of the vehicle so as to have a field of view of the front, side, or rear of the vehicle.

Since the image information captured by the image sensor includes image data, it may mean image data captured by the image sensor. Hereinafter, the image information captured by the image sensor means image data captured by the image sensor in the present disclosure. The image data captured by the image sensor may be created in a format of, for example, AVI, MPEG-4, H.264, DivX, or JPEG in a raw form. The image data captured by the image sensor may be processed by the processor.

In addition, the image sensor may be configured to be disposed in a vehicle so as to have a field of view of the exterior of the vehicle, thereby capturing image data. The image data captured by the image sensor may be processed by the processor to then be used to obtain first information on the target, thereby setting a monitoring range of the radar sensor according to the obtained first information. Monitoring range information may be used to obtain second information on the target based on a radar signal detected in the monitoring range and to detect malfunction of the radar by determining whether or not the first information matches the second information.

The processor may operate so as to process the image data captured by the image sensor. For example, at least some of the operation for setting the monitoring range of the radar may be performed by the processor.

The processor may be implemented using at least one of electronic units, which can perform processing of image data and other functions, such as application-specific integrated circuits (ASICs), digital signal processors (DSPs), digital signal processing devices (DSPDs), programmable logic devices (PLDs), field-programmable gate arrays (FPGAs), processors, controllers, microcontrollers, microprocessors, and the like.

The camera 110 may be mounted on the front of the vehicle, and may obtain an image of a field of view in front of the vehicle in frame units. According to an example, the camera 110 may be implemented as a CMOS camera or a CCD camera. However, this is an example only, and the camera 110 is not limited to any specific type, as long as it can obtain an image of a forward field of view.

The radar sensor 120 may transmit a radar signal, may detect the transmitted radar signal reflected by an object, and may provide information, such as a distance to the object around the vehicle, in frame units. The radar sensor 120 may include a transmission antenna for transmitting a radar signal and a reception antenna for detecting a reflected radar signal.

The radar sensor 120 used in the present disclosure may include one or more radar sensors, such as a front radar sensor mounted on the front of the vehicle, a rear radar sensor mounted on the rear of the vehicle, and a side or a side & rear radar sensor mounted on each side of the vehicle. The radar sensor or radar system may analyze transmission and reception signals to process data, thereby detecting information on the object, and may include an electronic control unit (ECU) or a processor for the same. Data transmission from the radar sensor to the ECU or signal communication therebetween may be performed using an appropriate communication link such as a vehicle network bus or the like.

The radar sensor may include one or more transmission antennas for transmitting radar signals and one or more reception antennas for receiving signals reflected by objects.

Meanwhile, the radar sensor according to the present embodiment may employ a multi-dimensional antenna array and a multiple-input multiple-output (MIMO) signal transmission/reception scheme in order to form a virtual antenna aperture greater than an actual antenna aperture.

For example, a two-dimensional antenna array is used to attain horizontal and vertical angular precision and resolution. Using the two-dimensional radar antenna array, signals may be transmitted and received by two individual horizontal and vertical scans (multiplexed in time), and MIMO may be used separately from the two-dimensional horizontal and vertical radar scans (time-multiplexing).

More specifically, the radar sensor according to the present embodiment may employ a two-dimensional antenna array configuration, which includes a transmission antenna unit including a total of twelve transmission antennas (Tx) and a reception antenna unit including sixteen reception antennas (Rx). As a result, the radar sensor may have a total of 192 virtual reception antenna arrangements.

In this case, the transmission antenna unit may have three transmission antenna groups, each including four transmission antennas, wherein the first transmission antenna group may be spaced a predetermined distance apart from the second transmission antenna group in the vertical direction and the first or second transmission antenna group may be spaced a predetermined distance (D) apart from the third transmission antenna group in the horizontal direction.

In addition, the reception antenna unit may include four reception antenna groups, each including four reception antennas, wherein the respective reception antenna groups may be arranged to be spaced apart from each other in the vertical direction, and the reception antenna unit may be disposed between the first transmission antenna group and the third transmission antenna group, which are spaced apart from each other in the horizontal direction.

In another embodiment, the antennas of the radar sensors may be arranged in a two-dimensional antenna array. For example, each antenna patch has a rhombus lattice arrangement, thereby reducing unnecessary side lobes.

Alternatively, the two-dimensional antenna array may include a V-shaped antenna array in which a plurality of radiation patches are arranged in a V shape, and, more specifically, may include two V-shaped antenna arrays. In this case, a single feed is provided to the apex of each V-shaped antenna array.

Alternatively, the two-dimensional antenna array may include an X-shaped antenna array in which a plurality of radiation patches are arranged in an X shape, and, more specifically, may include two X-shaped antenna arrays. In this case, a single feed is provided to the center of each X-shaped antenna array.

In addition, the radar sensor according to the present embodiment may use a MIMO antenna system in order to realize detection accuracy or resolution in the vertical and horizontal directions.

More specifically, respective transmission antennas in a MIMO system may transmit signals having independent and distinct waveforms. That is, each transmission antenna may transmit a signal in an independent waveform different from those of other transmission antennas, and respective reception antennas may determine the transmission antenna that transmitted the signal reflected by the object because the signals have different waveforms.

In addition, the radar sensor according to the present embodiment may be configured to include a radar housing that accommodates a substrate and a circuit including the transmission/reception antenna, and a radome that constitutes the appearance of a radar housing. In this case, the radome may be made of a material capable of reducing attenuation of the transmitted and received radar signals, and the radome may be configured as front and rear bumpers of the vehicle, a grill thereof, or the outer surface of a side vehicle frame or a vehicle component.

That is, the radome of the radar sensor may be disposed inside the vehicle grille, the bumper, the vehicle frame, or the like, or may be disposed as a part of components constituting the outer surface of the vehicle, such as a part of the vehicle grille, the bumper, or the vehicle frame, thereby providing convenience of mounting the radar sensor and a good appearance.

In the present disclosure, the radar sensor is not limited to any specific radar sensor, and the embodiments of the present disclosure can be substantially and identically applied to any radar sensor, except where not applicable.

The controller 130 may control the overall operation of the apparatus 100 for complementing automotive radar. According to an example, the controller 110 may be implemented as an electronic control unit (ECU). The controller 130 is configured to receive processing results of the image data and the sensing data from the processor, and is configured to process the image data and the sensing data. The controller 130 may detect malfunction of the radar sensor based at least in part on the processing of the image data and the sensing data.

The controller 130, based on the image of a field of view obtained through the camera 110, may set a preceding vehicle as a target. If the obtained image contains a plurality of preceding vehicles, a target may be set according to a predetermined condition. For example, the preceding vehicle closest in distance to the vehicle may be set as the target. However, the present disclosure is not limited to the above-mentioned configuration, which is only an example, and the setting condition of the target may vary as necessary.

The controller 130 may obtain first information on the target through image processing of the obtained image. According to an example, the first information may include information on the distance to the target, the speed of the target, the angle of the target based on the traveling path of the vehicle, or the holding time of the target. The image processing method is not limited to any specific method, as long as the first information can be acquired from the image obtained through the camera 110.

According to the first information obtained with respect to the target, the controller 130 may set a monitoring range for detecting a target in a field of sensing of the radar sensor 120. To this end, the controller 130 may match position information of the target in the image with position information in the field of sensing of the radar sensor. The controller 130 may set a monitoring range according to the position information on the target in the field of sensing of the radar sensor.

The controller 130 may process the radar signal detected in the set monitoring range, thereby obtaining second information on the target. According to an example, the second information may include information on the distance to the target, the speed of the target, the angle of the target based on the traveling path of the vehicle, or the holding time of the target. The method of processing the radar signal is not limited to any specific method, as long as the second information can be obtained based on the radar signal.

The controller 130 may continue to obtain the first information based on the image and the second information based on the radar signal for the same target. According to an example, the first information and the second information may be synchronized with each other to then be obtained in frame units. The controller 130 may compare the first information with the second information, which are obtained in synchronization with each other, to determine whether or not the first information matches the second information.

Since the first information and the second information are obtained for the same target, the first information and the second information may be substantially the same when the camera 110 and the radar sensor 120 are in normal operation. Here, that "the first information and the second information are substantially the same" means that the first information and the second information have the same value within a predetermined error range. Accordingly, if the second information is out of the predetermined error range with respect to the first information, the controller 130 may determine that the radar sensor 120 is malfunctioning.

For example, when the transmission or reception antenna of the radar sensor 120 is covered with foreign matter, such as snow accumulating around the same, the performance of the radar sensor 120 may gradually deteriorate, so that the accuracy of the second information on the target will be lowered. In addition, when the radar sensor 120 becomes misaligned due to an impact applied to the vehicle or the like, it may be determined that the detected direction is different from the actual direction so that the accuracy of the second information on the target may be lowered. In this case, an error between the first information and the second information will increase.

Accordingly, if the error exceeds a predetermined reference value, the controller 130 may detect that the radar sensor 120 is not operating normally. In this case, the controller 130 may output an alarm indicating malfunction of the radar sensor 120.

According to the above description, it is possible to more quickly and accurately detect malfunction of the radar sensor using error information calculated by comparing target information based on an image obtained by the camera with target information based on the radar signal.

An apparatus 100 for complementing automotive radar according to the present disclosure may include an image sensor disposed in a vehicle so as to have a field of view of the exterior of the vehicle and configured to capture image data, a radar sensor disposed in the vehicle so as to have a field of sensing for the exterior of the vehicle and configured to capture sensing data, and a domain control unit (DCU) configured to process the image data captured by the image sensor and the sensing data captured by the radar sensor and configured to control at least one driver assistance system provided in the vehicle.

According to an example, the processor for processing the image data, the controller, and the controllers of various devices provided in the vehicle may be integrated into a single domain control unit. In this case, the domain control unit may generate various vehicle control signals to control the driver assistance system provided in the vehicle and various devices of the vehicle associated therewith.

The domain control unit, based at least in part on the processing of the image data and the sensing data, may obtain first information on a target from an image obtained based on the processing of the image data, may set a monitoring range of the radar sensor according to the obtained first information, may obtain second information on the target based on the radar signal detected in the monitoring range, and may determine whether or not the first information matches the second information, thereby detecting a malfunction of the radar sensor. To this end, the domain control unit may include at least one processor.

The domain control unit may be provided in the vehicle, and may communicate with one or more image sensors and one or more non-image sensors, which are mounted in the vehicle. To this end, an appropriate data link or communication link, such as a vehicle network bus, for data transmission or signal communication may be further included.

The domain control unit may operate to control one or more of various driver assistance systems (DAS) used in the vehicle. The domain control unit may control a driver assistance system (DAS), such as a blind spot detection (BSD) system, an adaptive cruise control (ACC) system, a lane departure warning system (LDWS), a lane keeping assistance system (LKAS), a lane change assistance system (LCAS), and the like, based on the sensing data captured by a plurality of non-image sensors and the image data captured by the image sensor.

The domain control unit, based on the image of a field of view obtained through the camera 110, may set a preceding vehicle as a target. If the obtained image contains a plurality of preceding vehicles, the target may be set according to a predetermined condition. For example, a preceding vehicle closest in distance to the vehicle may be set as a target. However, the present disclosure is not limited to the above-mentioned configuration, which is only an example, and the setting condition of the target may vary as necessary.

The domain control unit may obtain first information on the target through image processing of the obtained image. According to an example, the first information may include information on the distance to the target, the speed of the target, the angle of the target based on the traveling path of the vehicle, or the holding time of the target. The image processing method is not limited to any specific method, as long as the first information can be acquired from the image obtained through the camera 110.

According to the first information obtained with respect to the target, the domain control unit may set a monitoring range for detecting a target in the field of sensing of the radar sensor 120. To this end, the domain control unit may match position information of the target in the image with position information in the field of sensing of the radar sensor. The domain control unit may set a monitoring range according to the position information on the target in the field of sensing of the radar sensor.

The domain control unit may process the radar signal detected in the set monitoring range, thereby obtaining second information on the target. According to an example, the second information may include information on the distance to the target, the speed of the target, the angle of the target based on the traveling path of the vehicle, or the holding time of the target. The method of processing a radar signal is not limited to any specific method, as long as the second information can be obtained based on the radar signal.

The domain control unit may continue to obtain the first information based on the image and the second information based on the radar signal for the same target. According to an example, the first information and the second information may be synchronized with each other to then be obtained in frame units. The domain control unit may determine whether or not the first information matches the second information, which are obtained in synchronization with each other, by comparing the same.

Since the first information and the second information are obtained for the same target, the first information and the second information may be substantially the same when the camera 110 and the radar sensor 120 are in normal operation. Here, that "the first information and the second information are substantially the same" means that the first information and the second information have the same value within a predetermined error range. Accordingly, if the second information is out of the predetermined error range with respect to the first information, the domain control unit may determine that the radar sensor 120 is malfunctioning.

For example, when the transmission or reception antenna of the radar sensor 120 is covered with foreign matter, such as snow accumulating around the same, the performance of the radar sensor 120 may gradually deteriorate, so that the accuracy of the second information on the target may be lowered. In addition, when the radar sensor 120 becomes misaligned due to an impact applied to the vehicle or the like, it may be determined that the detected direction is different from the actual direction so that the accuracy of the second information on the target may be lowered. In this case, an error between the first information and the second information will increase.

Accordingly, if the error exceeds a predetermined reference value, the domain control unit may detect that the radar sensor 120 is not in the normal state. In this case, the domain control unit may output an alarm indicating malfunction of the radar sensor 120.

According to the above description, it is possible to more quickly and accurately detect malfunction of the radar sensor using error information calculated by comparing target information based on an image obtained by the camera with target information based on the radar signal.

Hereinafter, the operation of an apparatus for complementing automotive radar will be described in more detail with reference to the related drawings. The following description will be made with reference to the controller 130, but the present disclosure is not limited thereto. The following description of the operation of the controller 130 may be performed in substantially the same manner by the domain control unit, except for what cannot be applied thereto.

Figure 2:
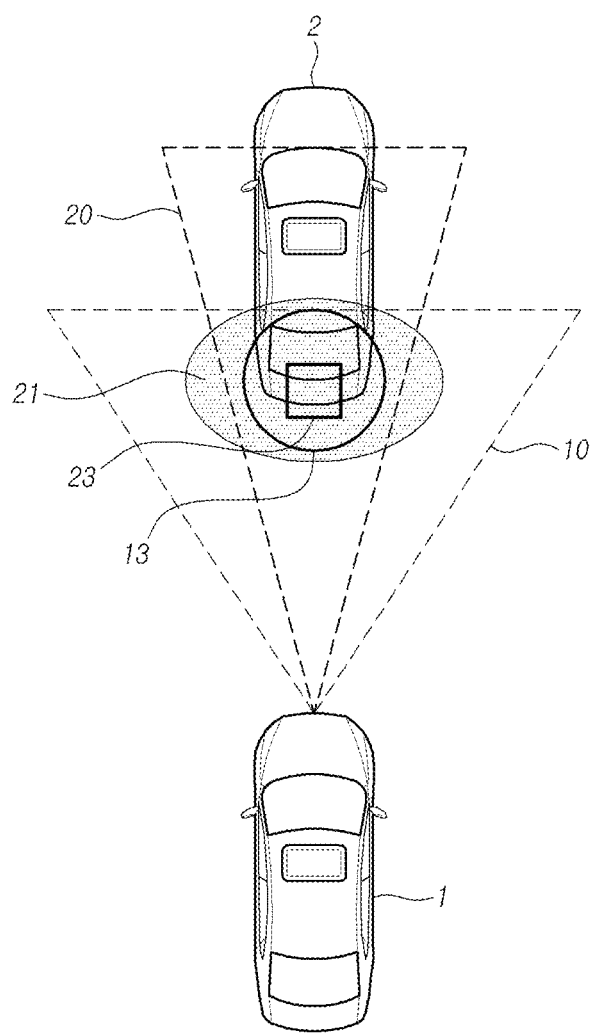
FIGS. 2 to 4 are views explaining detection of malfunction of a radar sensor using a target sensed by a camera and a radar sensor according to the present disclosure.
Figure 3:
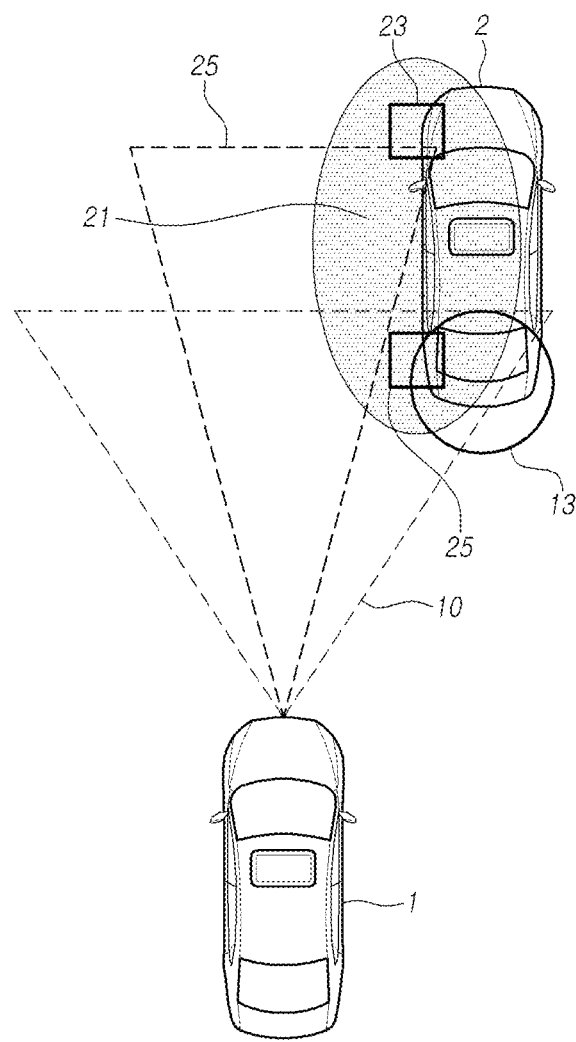
Figure 4:
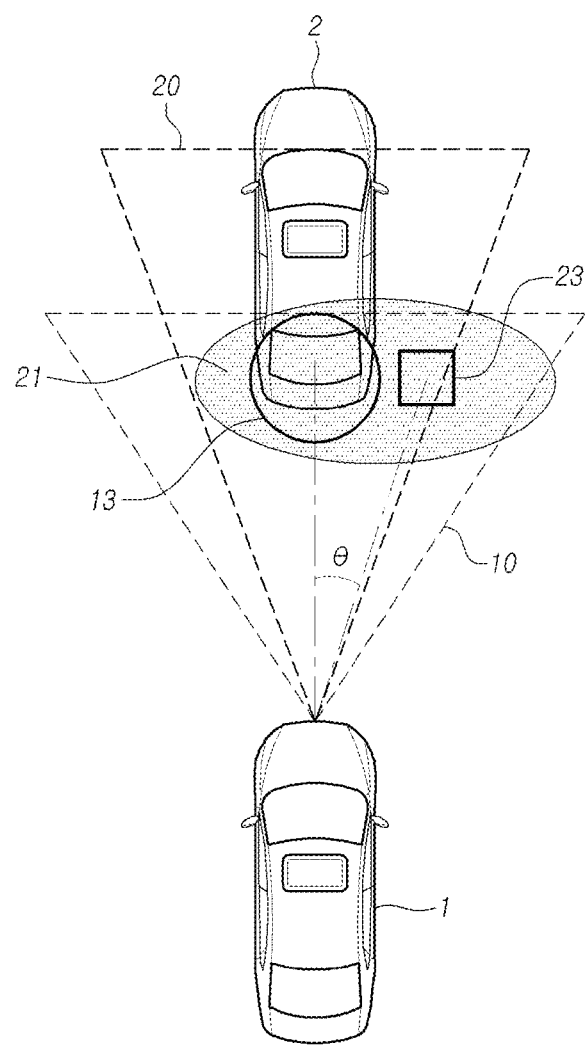
Figure 5:
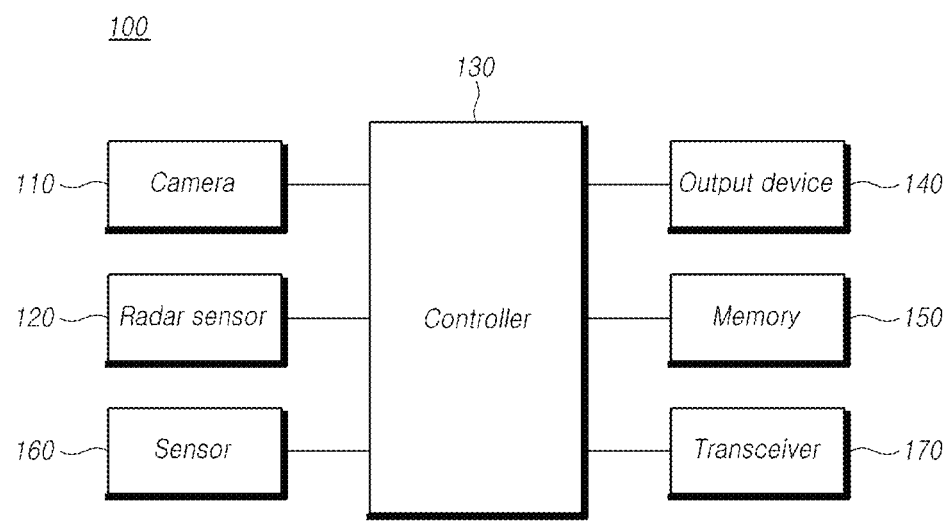
FIG. 5 is a block diagram of an apparatus for complementing automotive radar according to an embodiment of the present disclosure.

FIGS. 2 to 4 are views explaining detection of malfunction of a radar sensor using a target sensed by a camera and a radar sensor according to the present disclosure. FIG. 5 is a block diagram of an apparatus for complementing automotive radar according to an embodiment of the present disclosure.

Various sensors including a camera 110 and a radar sensor 120 are driven for various driver assistance systems mounted on the vehicle 1 during driving of the vehicle 1. FIG. 2 shows an example of a field of view 10 in which an image is captured by the camera 110 and a field 20 of sensing of the radar sensor 120.

The controller 130 may process an image obtained through the camera 110, thereby determining whether or not a target exists in the image. Referring to FIG. 2, the captured preceding vehicle 2 is illustrated as a target. The camera 110 may recognize the rear 13 of the vehicle, so that the rear of the vehicle may be set as a target. In addition, referring to FIG. 3, when the preceding vehicle 2 is travelling in the lane next to the vehicle, the rear 13 of the vehicle may be set as a target.

The controller 130 may obtain the distance, speed, and angle of the target as first information on the set target. According to an example, the controller 130 may obtain first information using the position, movement, etc. of the target in successive frames. However, this is only an example, and the method for obtaining the first information from the image captured by the camera 110 is not limited to any specific method.

The controller 130 may set a monitoring range 21 for detecting a target in the field 20 of sensing of the radar sensor 120 using the distance, speed, and angle information on the target. To this end, information for matching coordinate information in the image obtained through the camera 110 with coordinate information in the field of sensing through the radar sensor 120 may be pre-stored in the memory 150 shown in FIG. 5. The controller 130 may convert coordinate information on the target in the image to coordinates in the field of sensing of the radar sensor according to the first information.

Based on the position of the target 13 according to the converted coordinate relationship, the controller 130, as shown in FIG. 2, may set the monitoring range 21 on the basis of the center of the rear 13 of the vehicle in the field 20 of sensing of the radar sensor. When the preceding vehicle 2 is in the lane next to the vehicle and the rear 13 of the preceding vehicle 2 is far from the front center, as shown in FIG. 3, the controller 130 may set the monitoring range 21 based on the center of the side of the preceding vehicle 2.

The controller 130 may determine whether or not a target exists in the set monitoring range 21. The controller 130 may process a radar signal received in the set monitoring range 21, thereby detecting the target. As shown in FIG. 2, the radar sensor 120 may recognize the edge of the vehicle, thereby detecting the edge 23 of the vehicle as a target. As shown in FIG. 3, when the rear 13 of the vehicle is far from the front center, the edges 23 and 25 of the vehicle may be detected as targets.

The controller 130 may process a radar signal to obtain the distance, speed, and angle of the target as second information on the set target. According to an example, the controller 130 may obtain the second information using the position, movement, etc. of the target in successive frames. However, this is only an example, and the method for obtaining the second information from the image captured by the radar sensor 120 is not limited to any specific method.

The controller 130 may compare the first information with the second information, thereby determining whether or not the error between the first information and the second information exceeds a predetermined reference value. According to an example, the controller 130 may calculate a measurement offset for detecting the target within the monitoring range 21, and may reflect the measurement offset in the comparison of the first and second information. In addition, the threshold of the measurement offset may vary depending on the monitoring ranges.

If the error between the first information and the second information exceeds a predetermined reference value, the controller 130 may determine that the detection of the target by the camera 110 does not match the detection of the target by the radar sensor 120, and may count the number of mismatches. Information on the number of mismatches may be stored in the memory 150, and may be updated by the controller 130.

If the number of mismatches exceeds a predetermined reference value, the controller 130 may determine that the radar sensor 120 is in the blockage state. For example, when the transmission or reception antenna of the radar sensor 120 is covered with foreign matter, such as snow accumulating around the same, the performance of the radar sensor 120 may gradually deteriorate, so that the accuracy of the second information on the target may be lowered. That is, if snow gradually accumulates over time, the first information and the second information are continuously determined to be in the mismatched state according to the inaccuracy of the second information, so that the number of mismatches will increase. Accordingly, when the number of mismatches reaches a specific number, the controller 130 may determine that the radar sensor 120 is in the blockage state, and may output an alarm thereon.

According to an example, an output device 140 shown in FIG. 5 may include at least one of a display, a speaker, or a haptic module. The output device 140 may output a visual alarm through the display, may output an audible alarm through a speaker, or may output a tactile alarm through the haptic module, thereby indicating the blockage state of the radar sensor 120.

If the error between the first information and the second information is less than the predetermined reference value, the controller 130 may determine that the detection of the target by the camera 110 matches the detection of the target by the radar sensor 120, and may count the number of matches. Information on the number of matches may be stored in the memory 150, and may be updated by the controller 130.

When the number of matches exceeds a predetermined reference value, the controller 130 may identify whether or not the radar sensor 120 is determined to be in the blockage state. That is, in the above-described example, when snow gradually melts with over time, the accuracy of the second information increases. Therefore, the first information and the second information are continuously determined to match each other, so that the number of matches will increase. Accordingly, when the number of matches reaches a predetermined number, the controller 130 may determine that the radar sensor 120 has been released from the blockage state, and may terminate the alarm.

According to an example, when comparing the first information with the second information, the controller 130 may further reflect information sensed by other sensors 160 mounted on the vehicle or information received through the transceiver 170, as shown in FIG. 5. That is, the above-mentioned measurement offset value and the setting of predetermined reference values may be adjusted using temperature information or weather information outside the vehicle. For example, when the snowfall information is obtained, it is possible to make an adjustment such that the alarm for the deterioration of the radar sensor 120 can be provided more quickly by further lowering the reference value for the number of mismatches.

According to this, it is possible to more quickly and accurately detect whether or not the radar is blocked using error information calculated by comparing target information based on an image obtained by the camera with target information based on the radar signal.

As described above, the detection of the blockage of the radar sensor 120 has been described as an embodiment of the present disclosure. Hereinafter, detection of misalignment of the radar sensor 120 will be described as an example of malfunction of the radar sensor 120, according to another embodiment of the present disclosure.

Referring to FIG. 4, it is assumed that the radar sensor 120 is misaligned rightwards by an angle of θ, which is an example of malfunction of the radar sensor 120. The controller 130 may process the image obtained through the camera 110, thereby determining whether or not a target exists in the image. FIG. 4 shows that the preceding vehicle 2 is captured as a target. The camera 110 may recognize the rear 13 of the vehicle, and may set the same as a target.

The controller 130 may obtain the distance, speed, and angle of the target as first information on the set target, and may set a monitoring range 21 for detecting the target in the field 20 of sensing of the radar sensor 120. Based on the position of the target according to the first information, the controller 130 may set the monitoring range 21 on the basis of the center of the rear 13 of the vehicle in the field 20 of sensing of the radar sensor. However, since the radar sensor 120 is misaligned rightwards by an angle of θ, the monitoring range 21 is set to be shifted to the right, compared with the state in which the radar sensor 120 is normally aligned as shown in FIG. 2.

The controller 130 may determine whether or not a target exists in the set monitoring range 21. The controller 130 may process a radar signal received in the set monitoring range 21, thereby detecting a target. As shown in FIG. 4, the radar sensor 120 may recognize the edge 23 of the vehicle, thereby detecting the edge 23 of the vehicle as the target. That is, compared with the state in which the radar sensor 120 is in normal alignment as shown in FIG. 2, the edge 23 of the vehicle may be detected as if the preceding vehicle 2 were shifted by an angle of θ, rather than the actual position thereof.

The controller 130 may process the radar signal to obtain the distance, speed, and angle of the target as second information on the set target. According to an example, the controller 130 may further perform a process of determining whether or not the target 13 by the camera 110 and the target 23 by the radar sensor 120 are the same target.

If the target 13 by the camera 110 and the target 23 by the radar sensor 120 are not the same, or if no target 23 is detected by the radar sensor 120, the controller 130 may determine that the misalignment of the radar sensor 120 cannot be detected. In this case, the controller 130 may output a separate alarm indicating the same through the output device 140.

The controller 130 may compare the first information with the second information to determine whether or not an error between the first information and the second information exceeds a predetermined reference value. According to an example, the controller 130 may calculate a measurement offset in detecting the target within the monitoring range 21, and may reflect the measurement offset in the comparison of the first and second information. In addition, the threshold of the measurement offset may vary depending on the monitoring ranges.

If the error between the first information and the second information exceeds a predetermined reference value, the controller 130 may determine that the radar sensor 120 is misaligned. According to an example, the predetermined reference value may be set to be different from the criterion for detecting the blockage of the radar sensor 120. For example, since the misalignment of the radar sensor 120 mainly causes an error in the angle information on the target, the misalignment determination may be made by giving weight to the error in the angle of the target.

If it is determined that the radar sensor 120 is in the misaligned state, the controller 130 may output an alarm for the same. According to an example, the output device 140 may output a visual alarm through a display, may output an audible alarm through a speaker, or may output a tactile alarm through a haptic module, thereby indicating the misalignment of the radar sensor 120.

If the error between the first information and the second information is less than the predetermined reference value, the controller 130 may determine that the detection of the target by the camera 110 matches the detection of the target by the radar sensor 120. Since the misalignment of the radar sensor 120 has not been detected, the controller 130 may determine that the radar sensor 120 is aligned normally.

According to the present disclosure, it is possible to more quickly and accurately detect whether or not the radar sensor is misaligned using error information calculated by comparing target information based on an image obtained by the camera with target information based on the radar signal.

The method for complementing automotive radar according to the present disclosure may be implemented by the apparatus 100 for complementing automotive radar described above. Hereinafter, a method for complementing automotive radar according to the present disclosure and an apparatus 100 for complementing automotive radar for implementing the same will be described in detail with reference to the necessary drawings.

Figure 6:
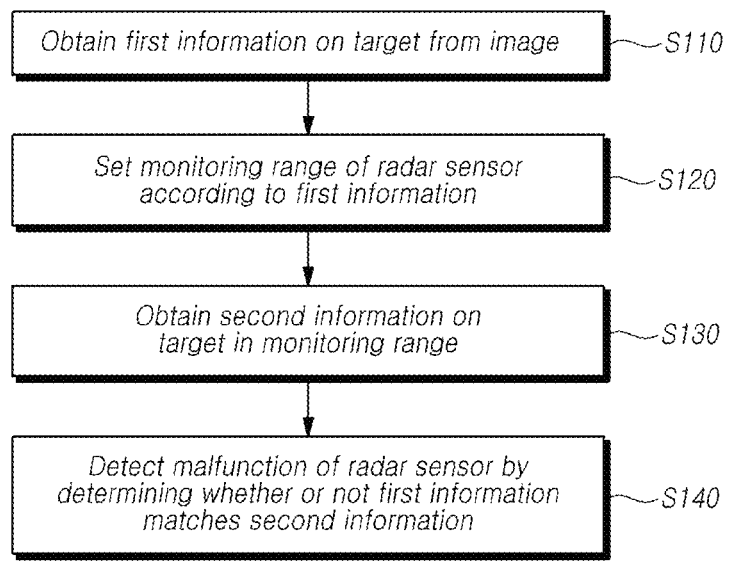
FIG. 6 is a flowchart of a method for complementing automotive radar according to the present disclosure.

FIG. 6 is a flowchart for a method for complementing automotive radar according to the present disclosure.

Referring to FIG. 6, an apparatus for complementing automotive radar may obtain an image of a field of view by using camera, thereby obtaining first information on a target (S110).

The camera in the apparatus for complementing automotive radar may be mounted on the front of the vehicle, and may obtain an image of a field of view in front of the vehicle in frame units. A controller of the apparatus for complementing automotive radar, based on the image of the field of view, which has been obtained through the camera, may set a preceding vehicle as a target.

The controller may obtain first information on the target through processing of the obtained image. According to an example, the first information may include information on the distance to the target, the speed of the target, the angle of the target based on the traveling path of the vehicle, or the holding time of the target.

Referring back to FIG. 6, the apparatus for complementing automotive radar may set a monitoring range of the radar sensor according to the first information (S120).

The radar sensor of the apparatus for complementing automotive radar may transmit a radar signal, may detect the transmitted radar signal reflected by an object, and may provide information such as a distance to the object around the vehicle in frame units.

The controller of the apparatus for complementing automotive radar may set a monitoring range for detecting a target in the field of sensing of the radar sensor according to the first information obtained with respect to the target. To this end, the controller may match position information on the target in the image with position information in the field of sensing of the radar sensor. The controller may set a monitoring range according to the position information on the target in the field of sensing of the radar sensor.

Referring back to FIG. 6, the apparatus for complementing automotive radar, based on the radar signal detected in the monitoring range, may obtain second information on the target (S130).

The controller of the apparatus for complementing automotive radar may process the radar signal detected in the set monitoring range, thereby obtaining the second information on the target. According to an example, the second information may include information on the distance to the target, the speed of the target, the angle of the target based on the traveling path of the vehicle, or the holding time of the target.

Referring back to FIG. 6, the apparatus for complementing automotive radar may determine whether or not the first information matches the second information, thereby detecting malfunction of the radar sensor (S140).

The controller of the apparatus for complementing automotive radar may continue to obtain the first information based on the image and the second information based on the radar signal for the same target. According to an example, the first information and the second information may be synchronized with each other to then be obtained in frame units. The controller may determine whether or not the first information matches the second information, which are obtained in synchronization with each other, by comparing the same with each other.

If the second information is not within a predetermined error range based on the first information, the controller may determine that the radar sensor malfunctions. For example, when the transmission or reception antenna of the radar sensor 120 is covered with foreign matter, such as snow accumulating around the same, the performance of the radar sensor 120 may gradually deteriorate, so that the accuracy of the second information on the target may be lowered. In addition, when the radar sensor is misaligned due to an impact on the vehicle or the like, it may be determined that the detected direction is different from the actual direction so that the accuracy of the second information on the target may be lowered. In this case, the error between the first information and the second information will increase.

Accordingly, if the error exceeds a predetermined reference value, the controller may detect that the radar sensor is not in the normal state. In this case, the controller may output an alarm indicating malfunction of the radar sensor.

According to this, it is possible to more quickly and accurately detect malfunction of the radar sensor by detecting whether or not the radar sensor malfunctions using error information calculated by comparing target information based on an image obtained by the camera with target information based on the radar signal.

Hereinafter, a method for complementing automotive radar will be described in more detail with reference to the related drawings.

Figure 7:
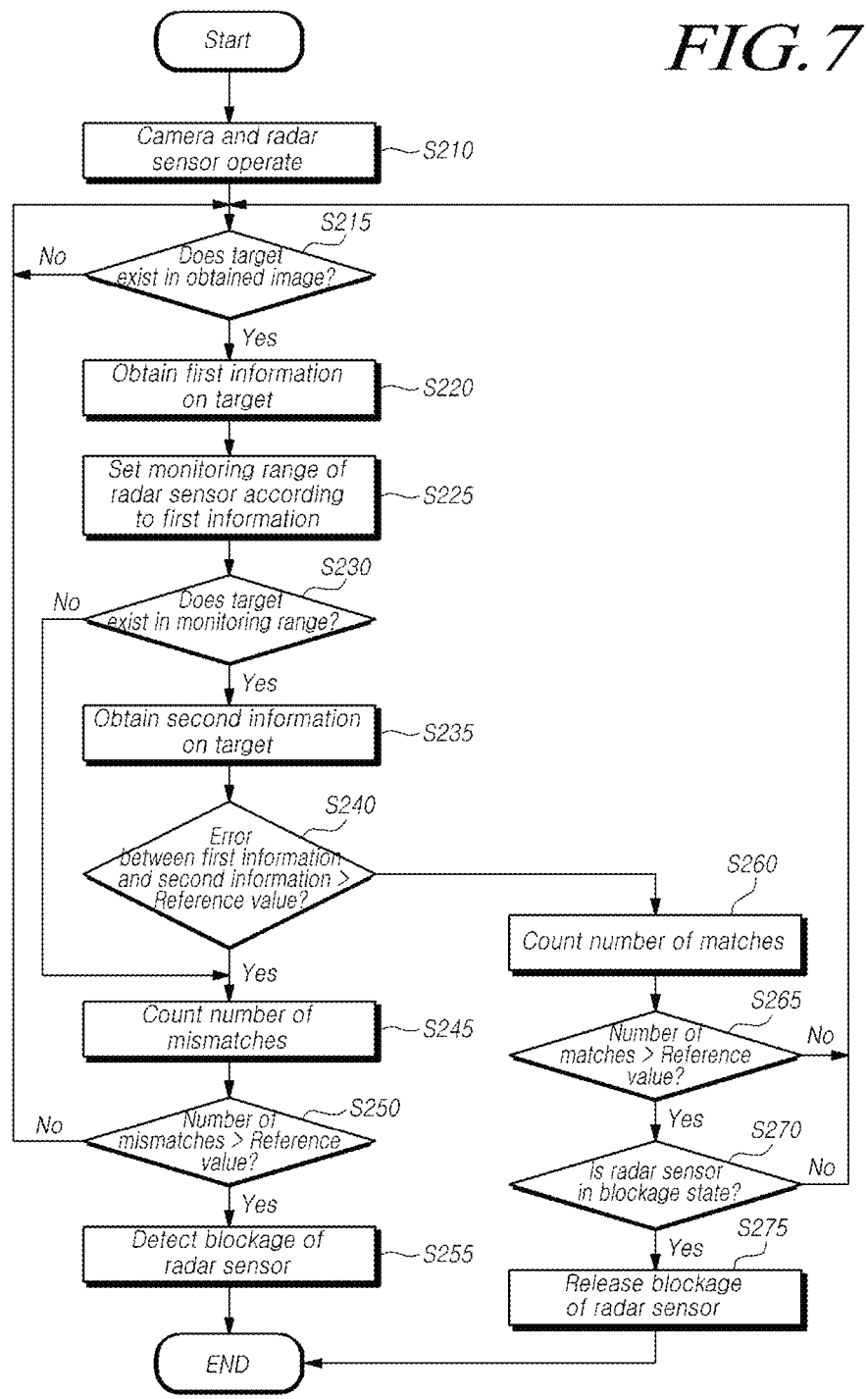
FIG. 7 is a flowchart explaining a method for detecting blockage of a radar sensor according to the present disclosure.
Figure 8:
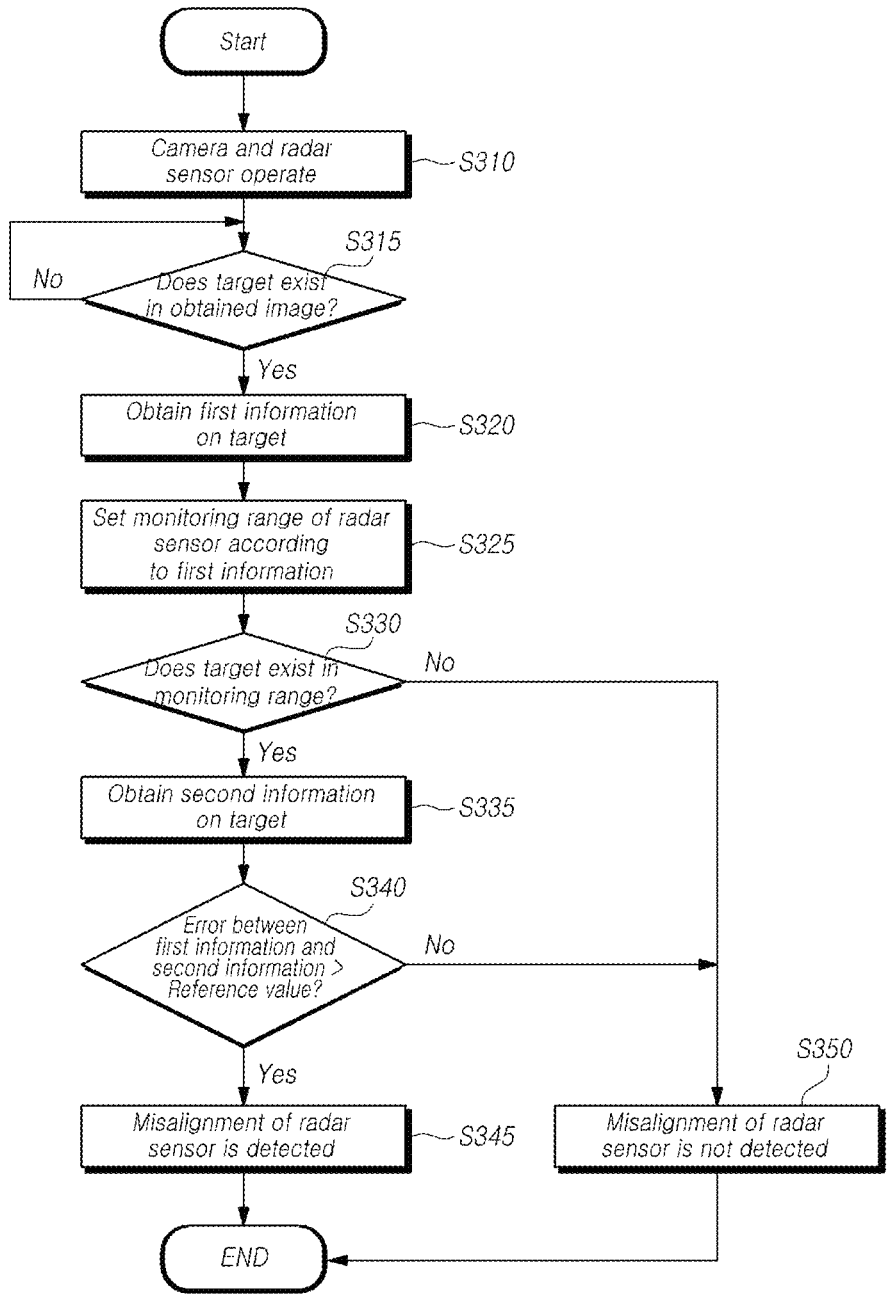
FIG. 8 is a flowchart explaining a method for detecting misalignment of a radar sensor according to the present disclosure.
Figure 9:
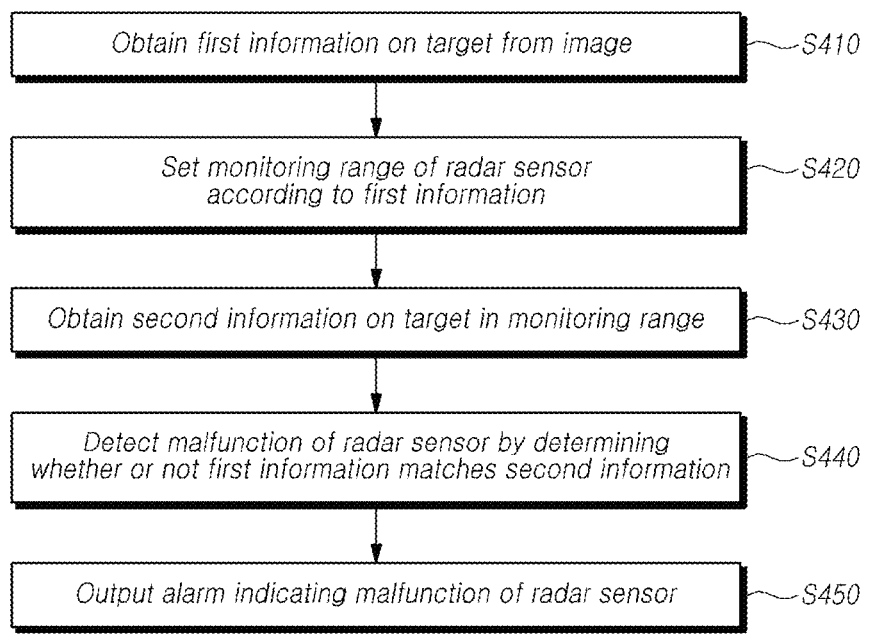
FIG. 9 is a flowchart explaining a method of outputting an alarm indicating malfunction of a radar sensor according to the present disclosure.

FIG. 7 is a flowchart explaining a method for detecting blockage of a radar sensor according to the present disclosure. FIG. 8 is a flowchart explaining a method for detecting misalignment of a radar sensor according to the present disclosure. FIG. 9 is a flowchart explaining a method of outputting an alarm indicating malfunction of a radar sensor according to the present disclosure.

Referring to FIG. 7, a camera and a radar sensor may be operated for various driver assistance systems during driving of the vehicle (S210). The controller of the apparatus for complementing automotive radar may process an image obtained by the camera, thereby determining whether or not a target exists in the image (S215). If no target exists in the image (No in S215), the controller may determine whether or not a target exists in the next frame obtained by the camera.

If a target exists in the image (Yes in S215), the controller may obtain the distance, speed, and angle of the target as first information on the set target (S220). According to an example, the controller may obtain the first information using the position, movement, etc. of the target in successive frames.

The controller may set a monitoring range for detecting the target in a field of sensing of the radar sensor using the distance, speed, and angle information on the target (S225). To this end, information for matching the coordinate information in the image obtained through the camera with the coordinate information in the field of sensing through the radar sensor may be pre-stored in the memory. The controller may convert the coordinate information on the target in the image to the coordinates in the field of sensing of the radar sensor according to the first information.

The controller may determine whether or not a target exists in the set monitoring range (S230). The controller may process a radar signal received in the set monitoring range, thereby detecting a target. If there is a target within the monitoring range (Yes in S230), the controller may process the radar signal to obtain the distance, speed, and angle of the target as second information on the set target (S235). According to an example, the controller may obtain the second information using the position, movement, etc. of the target in successive frames.

The controller may compare the first information with the second information to determine whether or not an error between the first information and the second information exceeds a predetermined reference value (S240). According to an example, the controller may calculate a measurement offset when detecting the target within the monitoring range, and may reflect the measurement offset in the comparison of the first information and the second information. In addition, the threshold of the measurement offset may vary depending on the monitoring ranges.

If the error between the first information and the second information exceeds a predetermined reference value (Yes in S240), the controller may determine that the detection of the target by the camera does not match the detection of the target by the radar sensor, and may count the number of mismatches (S245). Information on the number of mismatches may be stored in the memory 150, and may be updated by the controller 130.

In the above-mentioned step S230, even if no target exists within the monitoring range (No in S230), the controller may determine that the detection of the target by the camera does not match the detection of the target by the radar sensor, and may count the number of mismatches.

After updating the number of mismatches, the controller may determine whether or not the number of mismatches exceeds a predetermined reference value (S250). If the number of mismatches exceeds the predetermined reference value (Yes in S250), the controller may determine that the radar sensor is in the blockage state (S255). For example, when the transmission or reception antenna of the radar sensor is covered with foreign matter, such as snow accumulating around the same, the performance of the radar sensor may gradually deteriorate, so that the accuracy of the second information on the target may be lowered. That is, if snow gradually accumulates over time, the first information and the second information are continuously determined to be in the mismatched state according to the inaccuracy of the second information, so that the number of mismatches will increase. Accordingly, when the number of mismatches reaches a specific number, the controller may determine that the radar sensor is in the blockage state, and may output an alarm thereon.

If the number of mismatches is equal to or less than the predetermined reference value (No in S250), the controller may return to step S215 to then repeat the above-described operations. The predetermined reference value to be compared with the number of mismatches may vary as necessary. As the predetermined reference value is set to be smaller, the apparatus for complementing automotive radar may respond more sensitively to the blockage of the radar sensor.

Returning to step S240, if the error between the first information and the second information is less than the predetermined reference value, the controller may determine that the detection of the target by the camera matches the detection of the target by the radar sensor, and may count the number of matches (S260). Information on the number of matches may be stored in the memory, and may be updated by the controller.

The controller may determine whether or not the number of matches exceeds a predetermined reference value (S265). If the number of matches is equal to or less than a predetermined reference value (No in S265), the controller may return to step S215 to then repeat the above-described operations. The predetermined reference value to be compared with the number of matches may be varied as necessary. As the predetermined reference value is set to be smaller, the apparatus for complementing automotive radar may respond more sensitively to the release of the blockage of the radar sensor.

If the number of matches exceeds the predetermined reference value (Yes in S265), the controller may identify whether or not the radar sensor is determined to be in the blockage state (S270). That is, in the above-described example, when snow gradually melts over time, the accuracy of the second information increases. Therefore, the first information and the second information are continuously determined to match each other, so that the number of matches will increase. Accordingly, when the radar sensor is in the blockage state (Yes in S270), if the number of matches reaches a predetermined number, the controller may determine that the radar sensor has been released from the blockage state (S275). If the radar sensor is not currently in the blockage state (No in S270), the controller may return to step S215 to repeat the above-described operations.

According to this, it is possible to more quickly and accurately detect whether or not the radar sensor is blocked using error information calculated by comparing the target information based on the image obtained by the camera with target information based on the radar signal.

As described above, the detection of the blockage of the radar sensor has been described as an embodiment of the present disclosure. Hereinafter, detection of misalignment of the radar sensor will be described as an example of malfunction of the radar sensor, according to another embodiment of the present disclosure.

Referring to FIG. 8, since steps S310 to S325 are substantially the same as steps S210 to S225 described in FIG. 7, a redundant description will be omitted. In addition, it is assumed that the radar sensor is misaligned rightwards by an angle of θ, as an example of malfunction of the radar sensor.

Referring back to FIG. 8, the controller of the apparatus for complementing automotive radar, based on the position of the target according to the first information, may set a monitoring range in a field of sensing of the radar sensor (S325). However, since the radar sensor is misaligned rightwards by an angle of θ, the monitoring range is set to be shifted to the right, compared with the state in which the radar sensor is in normal alignment.

The controller may determine whether or not a target exists in the set monitoring range (S330). The controller may process a radar signal received in the set monitoring range, thereby detecting a target. In this case, compared with the state in which the radar sensor is in normal alignment, the target may be detected as if it were shifted by an angle of θ from the actual position thereof.

If the target exists in the monitoring range (Yes in S330), the controller may process the radar signal, thereby obtaining the distance, speed, and angle of the target as second information on the set target (S335). According to an example, the controller may further perform a process of determining whether or not the target obtained by the camera and the target obtained by the radar sensor are the same target. If the target obtained by the camera and the target obtained by the radar sensor are not the same, or if the target obtained by the radar sensor is not detected (No in S330), the controller may determine that the misalignment of the radar sensor cannot be detected (S350). In this case, the controller may output a separate alarm indicating the same through an output device.

The controller may compare the first information with the second information to determine whether or not an error between the first information and the second information exceeds a predetermined reference value (S340). According to an example, the controller may calculate a measurement offset in detecting the target within the monitoring range, and may reflect the measurement offset in the comparison of the first and second information. In addition, the threshold of the measurement offset may vary depending on the monitoring ranges.

If the error between the first information and the second information exceeds a predetermined reference value (Yes in S340), the controller may determine that the radar sensor is misaligned. According to an example, the predetermined reference value may be set to be different from the criterion for detecting the blockage of the radar sensor. For example, since the misalignment of the radar sensor mainly causes an error in the angle information on the target, the misalignment determination may be made by giving weight to the error in the angle of the target.

If the error between the first information and the second information is less than the predetermined reference value (No in S340), the controller may determine that the detection of the target by the camera matches the detection of the target by the radar sensor. That is, since the misalignment of the radar sensor has not been detected (S350), the controller may determine that the radar sensor is in normal alignment.

According to the present disclosure, it is possible to more quickly and accurately detect whether or not the radar sensor is misaligned using error information calculated by comparing target information based on an image obtained by the camera with target information based on the radar signal.

The method in which an apparatus for complementing automotive radar detects malfunction of the radar sensor, such as the blockage state or misalignment thereof, has been described above. Hereinafter, a method in which an apparatus for complementing automotive radar outputs an alarm indicating the detected malfunction of the radar sensor will be described.

Referring to FIG. 9, since steps S410 to S440 are substantially the same as steps S110 to S140 described in FIG. 6, a redundant description thereof will be omitted.

The apparatus for complementing automotive radar may output an alarm indicating the detected malfunction of the radar sensor through an output device (S450).

According to an example, an output device included in the apparatus for complementing automotive radar may include at least one of a display, a speaker, or a haptic module. The output device may output a visual alarm through the display, may output an audible alarm through the speaker, or may output a tactile alarm through the haptic module, thereby providing notification of the blockage of the radar sensor.

In addition, the output device may output a visual alarm through the display, may output an audible alarm through the speaker, or may output a tactile alarm through the haptic module, thereby providing notification of the misaligned state of the radar sensor.

According to the present disclosure, it is possible to promptly notify the driver of information on the malfunction of the radar sensor by outputting an alarm for the detected blockage or misalignment of the detected radar sensor by comparing the target information based on the image obtained by the camera with the target information based on the radar signal.

The above-described disclosure may be implemented as computer-readable code on a medium on which a program is recorded. The computer-readable medium includes all kinds of recording devices in which data that can be read by a computer system is stored. For example, the computer-readable medium includes a hard disk drive (HDD), a solid state disk (SSD), a silicon disk drive (SDD), a ROM, a RAM, a CD-ROM, a magnetic tape, a floppy disk, and an optical data storage device. In addition, the computer-readable medium may be implemented in the form of a carrier wave (e.g., transmission over the Internet).

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. An apparatus for complementing automotive radar, the apparatus comprising:
an image sensor operable to be disposed in a vehicle so as to have a field of view of the exterior of the vehicle, the image sensor configured to capture image data;
a radar sensor operable to be disposed in the vehicle so as to have a field of sensing for the exterior of the vehicle, the radar sensor configured to capture sensing data;
at least one processor configured to process the image data captured by the image sensor and the sensing data captured by the radar sensor; and
a controller configured to detect malfunction of the radar sensor, based at least in part on processing of the image data and the sensing data,
wherein the controller is configured to: obtain first information on a target from an image obtained based on the processing of the image data; set a monitoring range of the radar sensor according to the obtained first information; obtain second information on the target based on a radar signal detected in the monitoring range; and detect malfunction of the radar sensor by detecting an error between the first information and the second information.

2. The apparatus of claim 1, wherein the first information comprises a distance, a speed, and an angle of the target obtained based on the image, and
wherein the second information comprises a distance, a speed, and an angle of the target obtained based on the radar signal detected in the monitoring range.

3. The apparatus of claim 1, wherein the controller is configured to, when the error between the first information and the second information exceeds a predetermined criterion, count a number of detections that the error between the first information and the second information is greater than the predetermined criterion.

4. The apparatus of claim 3, wherein the controller determines that the radar sensor is in a blockage state when the number of the detections that the error between the first information and the second information is greater than the predetermined criterion exceeds a predetermined reference value.

5. The apparatus of claim 1, wherein the controller is configured to, when the error between the first information and the second information is less than a predetermined criterion, count a number of detections that the error between the first information and the second information is less than the predetermined criterion.

6. The apparatus of claim 5, wherein the controller is configured to, if the number of the detections that the error between the first information and the second information is less than the predetermined criterion exceeds a predetermined reference value when the radar sensor is in a blockage state, determine that the blockage state of the radar sensor has been released.

7. The apparatus of claim 1, wherein the controller detects misalignment of the radar sensor based on an error of the second information with respect to the first information.

8. The apparatus of claim 1, further comprising an output device configured to output at least one of a visual alarm, an audible alarm, or a tactile alarm indicating malfunction of the radar sensor.

9. An apparatus for complementing automotive radar, the apparatus comprising:
an image sensor operable to be disposed in a vehicle so as to have a field of view of the exterior of the vehicle, the image sensor configured to capture image data;
a radar sensor operable to be disposed in the vehicle so as to have a field of sensing of the exterior of the vehicle, the radar sensor configured to capture sensing data; and
a controller configured to process the image data captured by the image sensor and the sensing data captured by the radar sensor, and configured to control at least one driver assistance system provided in the vehicle,
wherein the controller is configured to: based at least in part on processing of the image data and the sensing data, obtain first information on a target from an image obtained based on the processing of the image data; set a monitoring range of the radar sensor according to the obtained first information; obtain second information on the target based on a radar signal detected in the monitoring range; and detect malfunction of the radar sensor by detecting an error between the first information and the second information.

10. The apparatus of claim 9, wherein the first information comprises a distance, a speed, and an angle of the target obtained based on the image, and
wherein the second information comprises a distance, a speed, and an angle of the target obtained based on the radar signal detected in the monitoring range.

11. The apparatus of claim 9, wherein the controller is configured to, when the error between the first information and the second information exceeds a predetermined criterion, count a number of detections that the error between the first information and the second information is greater than the predetermined criterion.

12. The apparatus of claim 11, wherein the controller determines that the radar sensor is in a blockage state when the number of the detections that the error between the first information and the second information is greater than the predetermined criterion exceeds a predetermined reference value.

13. The apparatus of claim 9, wherein the controller is configured to, when the difference between the first information and the second information is less than a predetermined criterion, count a number of detections that the error between the first information and the second information is less than the predetermined criterion.

14. The apparatus of claim 13, wherein the controller is configured to, if the number of the detections that the error between the first information and the second information is less than the predetermined criterion exceeds a predetermined reference value when the radar sensor is in a blockage state, determine that the blockage state of the radar sensor has been released.

15. The apparatus of claim 9, the controller detects misalignment of the radar sensor based on an error of the second information with respect to the first information.

16. The apparatus of claim 9, further comprising an output device configured to output at least one of a visual alarm, an audible alarm, or a tactile alarm indicating malfunction of the radar sensor.

17. A controller for detect malfunction of a radar sensor, the controller configured to:
process and use image data captured by, an image sensor disposed in a vehicle to have a field of view of an exterior of the vehicle, to obtain first information on a target and set a monitoring range of a radar sensor according to the obtained first information, and use monitoring range information to obtain second information on the target based on a radar signal detected in the monitoring range and detect the malfunction of the radar sensor by detecting an error between the first information and the second information.

18. A method for complementing automotive radar, the method comprising:
obtaining an image of a field of view through a camera to obtain first information on a target;
setting a monitoring range of a radar sensor according to the first information;
obtaining second information on the target based on a radar signal detected in the monitoring range; and
detecting malfunction of the radar sensor by detecting an error between the first information and the second information.

* * * * *